(No Model.)
B. G. LAMME.
METHOD OF AND MEANS FOR REGULATING ALTERNATING CURRENT GENERATORS.
No. 574,035. Patented Dec. 29, 1896.
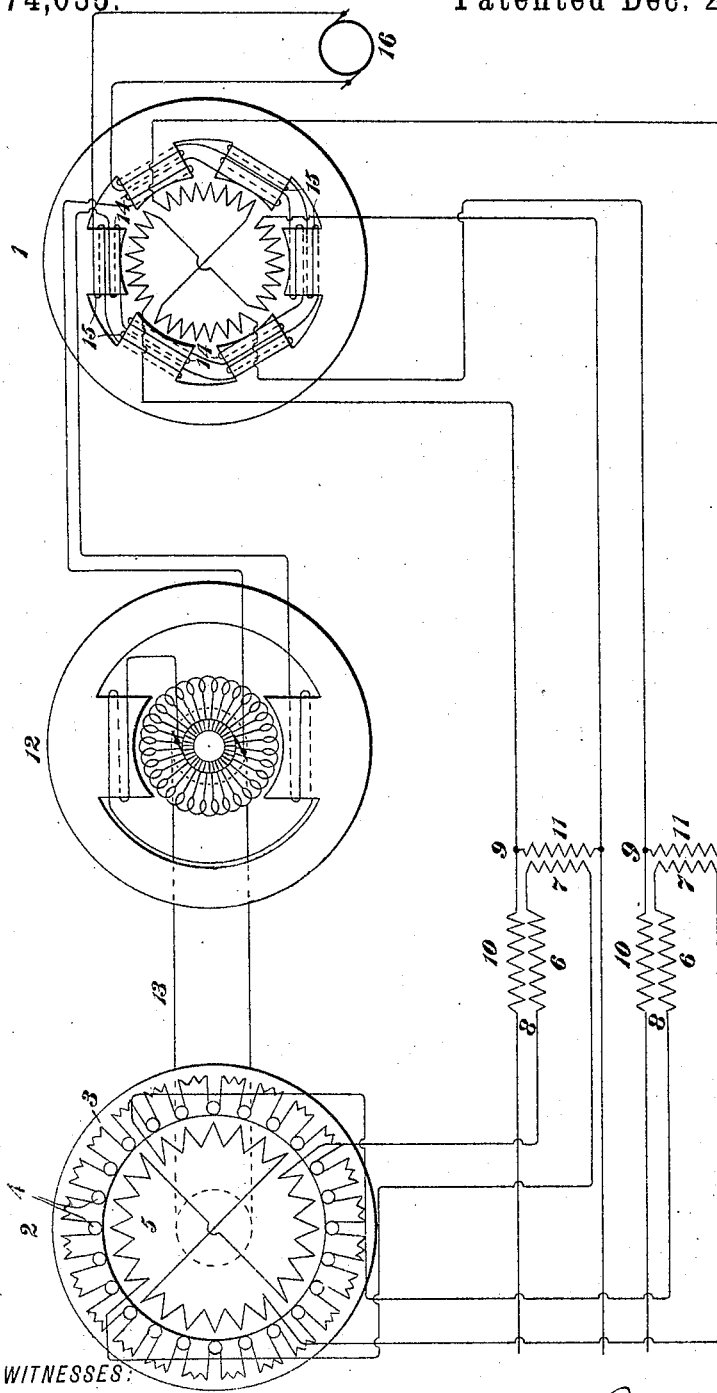

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

METHOD OF AND MEANS FOR REGULATING ALTERNATING-CURRENT GENERATORS.

SPECIFICATION forming part of Letters Patent No. 574,035, dated December 29, 1896.

Application filed March 11, 1896. Serial No. 582,764. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Methods of and Means for Regulating Alternating-Current Generators, (Case No. 685,) of which the following is a specification.

My invention relates to the regulation of alternating-current electric generators; and it has for its object to provide a method and means whereby a generator of this character may be regulated to supply an electromotive force which will correspond to changes in its load by varying the electromotive force supplied to its field-magnets.

In all systems of distribution of electrical energy, whether direct or alternating, it is necessary to provide some means whereby the generator may be regulated to give either a constant current or a constant potential on the line under variations in loads. This regulation has been effected in various ways, but the most usual method is that which involves changes in the generator field-magnet excitation.

My present invention contemplates the necessary regulation of an alternating-current generator by varying the electromotive force supplied to its field-magnet as its load varies, and to effect this result I utilize a direct-current generator and, as a driver therefor, a non-synchronous motor, the slip of which is made directly dependent upon the load carried by the generator to be regulated.

In the accompanying drawing I have illustrated diagrammatically a series of machines and circuits suitable for carrying out my invention, in which 1 is the alternating-current generator to be regulated, and 2 is a non-synchronous motor, the secondary member of which is provided with a winding closed upon itself, as is usual in such machines. This winding is indicated in the drawing as consisting of end rings 3 and bars 4, but conductors having any other suitable form and arrangement may be employed. The primary winding 5 of the motor 2 is supplied with current from the secondaries 6 and 7 of transformers 8 and 9, such secondaries being connected in series. The primaries 10 and 11 of these transformers are respectively connected in series and in shunt with the circuits supplied by the generator 1. Both generator and motor are illustrated as of the two-phase variety, but it will be understood that the invention is applicable to single-phase machines or to those having any other number of phases suitable for practical use.

The induction-motor 2 drives the armature of a direct-current generator 12 by means of a belt 13 or other suitable power-transmitting device. This generator 12 is shown in the drawing as of the series-wound type and as supplying exciting current for a set of coils 14 on the field-magnet of the generator 1, another set of coils 15 on said field-magnet being supplied with current from a separate generator 16. My invention is not limited, however, to any special method of utilizing the generator 12 in connection with the excitation for the field-magnet of the generator 1 nor to a generator of any special type. The generator 12 may be either shunt or compound wound, and it may be employed to add to the voltage supplied by the exciter 16 to regulate the field of such exciter or to supply the entire exciting current for the generator 1. If it is employed in the last-named capacity, however, some means will be necessary for initially bringing the system up to the normal voltage. The non-synchronous motor 2 employed for driving the generator 12 must necessarily have considerable resistance in its secondary circuit, so that its drop in speed with a decrease in load upon the main generator-circuit will be considerable, and such resistance may be so applied as to be varied to suit different conditions in any manner well known in the art. The drop in speed or slip of the motor in the organization shown, provided the motor is properly designed, will decrease with an increase in the primary voltage, and vice versa. The electromotive force supplied to the primary coils of the motor being derived from transformers the primaries of which are connected, respectively, in shunt and in series relation with the main generator-circuit, it will be the resultant of two combined electromotive forces, one of which is dependent upon the electromotive force of the main circuit and the other upon the current in such circuit. It follows, therefore, that any increase in the load will cause an increase in the electromotive force applied to the motor as the load on the generator 1 increases, and therefore effect a decrease in its slip. This action will result in the speeding up of the direct-current generator 10, and thus produce the desired increase in electromotive force for the excitation of the field-magnets of the generator 1.

I desire it to be understood that my invention is not limited to the use of shunt and series connected transformers for securing an electromotive force corresponding to the load upon the generator, since any other known means which is suitable may obviously be employed for securing the desired electromotive force.

It will of course be understood that if the motor 2 be of the single-phase non-synchronous type it will be necessary to provide some means for initially bringing it up to normal speed at the start, but when so brought up to speed it may be employed in the manner already indicated for regulating a single-phase generator. It will also be understood that the secondaries 6 and 7 of the transformers 8 and 9 may be connected so as to subtract instead of add their electromotive forces, in which case the generator 1 would be differentially compounded.

Other variations from what is shown may be made without departing from the spirit and scope of my invention, and hence I do not desire to limit my invention to what is specifically shown and described.

I claim as my invention—

1. The method of varying the electromotive force of an alternating-current generator as its load varies, which consists in varying the slip of an alternating-current motor driven by current derived from said generator, and producing a field-magnet exciting or regulating current by the power derived from said motor.

2. The method of regulating alternating-current generators and motors which consists in varying the slip of a non-synchronous motor driven by current derived from said generator and driving an exciting or regulating generator by such non-synchronous motor.

3. Means for regulating the electromotive force supplied by an alternating-current generator, comprising two transformers having their primaries connected respectively in shunt and in series with the circuit supplied by said generator, a non-synchronous motor having its primary member connected in series with the secondaries of said transformers, and a direct-current generator driven by said motor and supplying current for producing in whole or in part the field-magnet excitation of said alternating-current generator.

4. Means for varying the electromotive force of an alternating-current generator in accordance with changes in its load, comprising transformers having their primaries connected respectively in shunt and in series with said generator-circuit and their secondaries connected in series with each other, a non-synchronous motor supplied with current from said secondaries, a direct-current generator driven by said motor and supplying current to be utilized for energizing in whole or in part the field-magnets of said alternating-current generator.

5. The combination with an alternating-current generator, of means for varying the electromotive force supplied to its field-magnet coils in accordance with variations in its load, comprising a direct-current generator, a non-synchronous motor for driving the same and means for supplying the primary member of such motor with an electromotive force which is dependent upon the load carried by said alternating-current generator.

6. The combination with an alternating-current generator, of a direct-current generator for supplying in whole or in part the energizing-current for the field-magnets of said alternating-current generator, a non-synchronous motor for driving said direct-current generator, and means for varying the slip of said motor as the load upon the alternating-current-generator circuit is varied.

In testimony whereof I have hereunto subscribed my name this 7th day of March, A. D. 1896.

BENJ. G. LAMME.

Witnesses:
WESLEY G. CARR,
HUBERT C. TENER.